(12) United States Patent
Ogino et al.

(10) Patent No.: US 6,236,561 B1
(45) Date of Patent: May 22, 2001

(54) CHIP TYPE SOLID ELECTROLYTIC CAPACITOR AND ITS MANUFACTURING METHOD

(75) Inventors: Masakuni Ogino, Kanota; Masahiro Yabushita, Uji; Koji Ueoka, Nara; Takashi Iwakiri, Kyoto; Tsuyoshi Yoshino, Kameoka, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/334,771

(22) Filed: Jun. 16, 1999

(30) Foreign Application Priority Data

Jun. 18, 1998 (JP) .................................................. 10-171058
Apr. 26, 1999 (JP) .................................................. 11-117645

(51) Int. Cl.[7] ...................................................... H01G 9/00
(52) U.S. Cl. .......................... 361/523; 361/523; 361/301.3; 361/528
(58) Field of Search ................................. 361/528, 540, 361/523, 529, 532–533, 534–535, 538, 301.3, 813; 29/25

(56) References Cited

U.S. PATENT DOCUMENTS

| | | | |
|---|---|---|---|
| 3,588,628 | 6/1971 | Peck | 317/230 |
| 4,017,773 | * 4/1977 | cheseldine. | 361/433 |
| 4,166,286 | * 8/1979 | Boissonnault. | 361/433 |
| 4,539,623 | 9/1985 | Irikura et al. | 361/433 |
| 4,581,479 | 4/1986 | Moore et al. | 174/52 |
| 5,424,907 | * 6/1995 | Kojima et al. | 361/532 |
| 5,905,301 | * 5/1999 | Ichikawa et al. | 257/676 |

FOREIGN PATENT DOCUMENTS

| | | |
|---|---|---|
| 10092697 | 4/1998 | (EP) . |
| 2 123 610 | 2/1984 | (GB) . |

* cited by examiner

*Primary Examiner*—Dean A. Reichard
(74) *Attorney, Agent, or Firm*—Parkhurst & Wendel, L.L.P (57) ABSTRACT

A chip type solid electrolytic capacitor of the present invention has a section formed in a step-wise manner on a cathode lead frame that is connected with a capacitor element. An anode lead wire of the capacitor element is resistance welded to the top of a reversed V-letter shaped structure formed by folding part of an anode lead frame into halves. Further, with the chip type solid electrolytic capacitor of the present invention, part of respective cathode and anode lead frames is exposed outside in such a way as being made flush with the periphery of a resin package, thereby each serving as a terminal. Accordingly, a space problem due to the terminals has been eliminated and the anode lead wire can be made short, thus allowing the volume of a capacitor element employed to be increased. As a result, a chip type solid electrolytic capacitor having a large capacity with its outer dimensions is kept the same as a prior art capacitor can be obtained.

25 Claims, 9 Drawing Sheets

PRIOR ART

CHIP TYPE SOLID ELECTROLYTIC CAPACITOR AND ITS MANUFACTURING METHOD

FIELD OF THE INVENTION

The present invention relates to a chip type solid electrolytic capacitor used for surface mount technology in a variety of electronic equipment and a manufacturing method thereof.

BACKGROUND OF THE INVENTION

In recent years, use of chip type electronic components has been rapidly increasing as electronic equipment requires reduction in size and weight and the surface mount technology progresses forward. This applies to capacitors, also, and a reduction in size and an increase in per unit capacity are required for chip type solid electrolytic capacitors.

Figure 9:
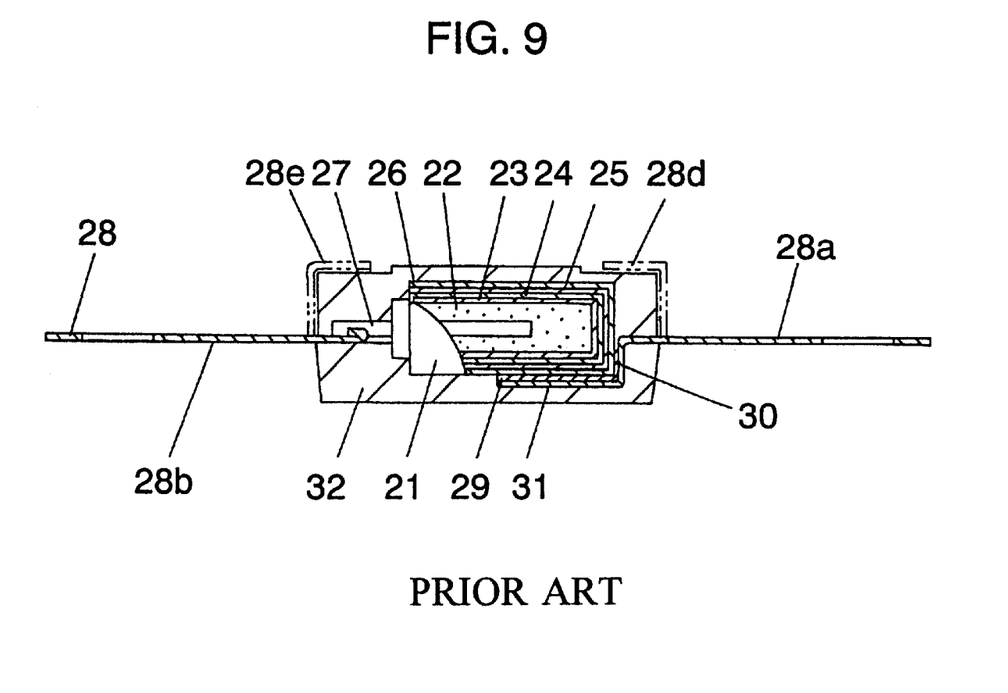
FIG. 9 is a cross-sectional view of a prior art chip type solid electrolytic capacitor.

A description of a conventional chip type solid electrolytic capacitor is made in the following:

FIG. 9 shows a prior art chip type solid electrolytic capacitor. Reference symbol 21 is a capacitor element in FIG. 9. The capacitor element 21 is prepared, according to a widely known method, by forming an oxide layer 23, an electrolyte layer 24 and a carbon layer 25 in succession on the surface of a porous anode body 22 formed by powder molding and sintering of a valve metal with an anode lead wire 27 buried inside thereof. And, one end of the anode lead wire 27 is exposed. Then a cathode layer 26 composed of a silver paint is formed over the carbon layer 25.

The anode lead wire 27 extending out of the capacitor element 21 is cut with the necessary portion thereof left and then the cathode layer 26 of the capacitor element 21 is connected with and fixed to a cathode lead frame 28a formed on a belt like metal frame 28 by means of a conductive adhesive 31.

By resistance welding, the anode lead wire 27 is joined with and fixed to an anode lead frame 28b formed on the same frame 28.

Next, the capacitor element 21 fixed to the foregoing frame 28 is encapsulated with an electrically insulating resin by a transfer molding method to form a resin package 32. The cathode lead frame 28a and anode lead frame 28b of the frame 28 are cut to a predetermined length to serve as a terminal. And, a capacitor element 21 is cut off from the frame 28.

Then, both lead frames 28a and 28b are bent along the periphery of the resin package 32 to make a cathode terminal 28d and an anode terminal 28e, respectively, thus completing a chip type solid electrolytic capacitor.

However, with the foregoing prior art chip type solid electrolytic capacitor, the cathode lead frame 28a of the frame 28 has a gutter-like guide 29 formed by bending both edges upward for aligning the position of the capacitor element 21 and is bent at a shoulder 30 downward by one step in a step-wise manner to provide a place for connection beneath the cathode layer 26 of the capacitor element 21. The connection is performed by means of the conductive adhesive 31. Furthermore, since the cathode lead frame 28a and anode lead frame 28b of the frame 28 are respectively bent to form the cathode terminal 28d and anode terminal 28e after the capacitor element 21 has been encapsulated with an electrically insulating resin, the volume of the capacitor element 21 cannot be increased if the capacitor element 21 is to be contained in the predetermined volume of the resin package 32, thus presenting a problem to be solved.

In other words, a section provided on the end part of the cathode lead frame 28a for the connection with the cathode layer 26 by the shoulder 30, where the cathode lead frame 28a is bent downward by one step in a step-wise manner, a part of the cathode terminal 28 bent along the periphery of the resin package 32 and a part of the anode terminal 28e together prevent the capacitor element 21 from being increased in volume.

Further, when the anode lead wire 27 is joined with the anode lead frame 28b by resistance welding, the junction between the anode lead frame 28b and the anode lead wire 27 tends to become long due to a flattening process applied to the place of the anode lead frame 28b where the anode lead wire 27 is joined, thereby causing a problem of hindering the volume of the capacitor element 21 from being increased.

The present invention deals with these problems involved with prior art chip type solid electrolytic capacitors and serves the purpose of providing a chip type solid electrolytic capacitor, whereby large capacity in the smallest possible size is realized, and disclosing its manufacturing method.

SUMMARY OF THE INVENTION

A chip type electrolytic capacitor of the present invention has:

a capacitor element with an anode lead wire built in while the anode lead wire is exposed at one end;

an anode lead frame with a first end connected to the anode lead wire extending from the capacitor element and a second end acting as an external connection terminal;

a cathode lead frame with a first end connected to a cathode layer of the capacitor element and a second end made to serve as an external connection terminal; and an electrically insulating resin package encapsulating the capacitor element, and comprising a structure which exposes part of the external connection terminal of the anode lead frame and the cathode lead frame, such that each frame is almost flush with the outer surface of the resin package.

A manufacturing method of a chip type solid electrolytic capacitor according to the present invention comprising:

preparing a resin molding die wherein a parting line coincides with an outer surface of a resin package that encapsulates a capacitor element, with which an anode lead frame and a cathode lead frame are exposed such that each frame is made almost flush with the outer surface of the resin package; and encapsulating the capacitor element with an electrically insulating resin by using the resin molding die.

The present invention makes it possible to provide a chip type solid electrolytic capacitor having a large capacity in the smallest possible size.

DESCRIPTION OF THE PREFERRED EMBODIMENTS

A description is made of some of the exemplified embodiments of the present invention with reference to drawings in the following:

First Exemplary Embodiment

Figure 1A:
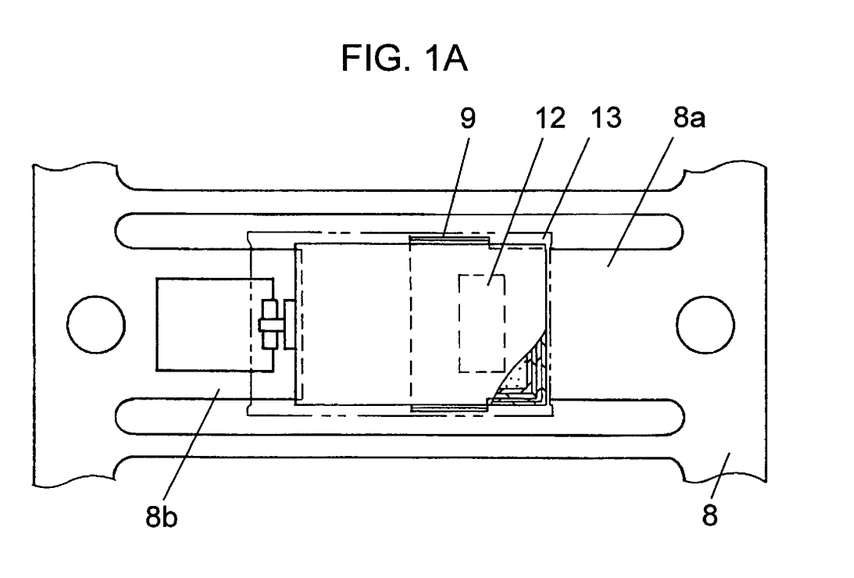
FIG. 1A is a partial cut away plan view of a chip type solid electrolytic capacitor under assembly work in a first exemplary embodiment of the present invention.
Figure 1B:
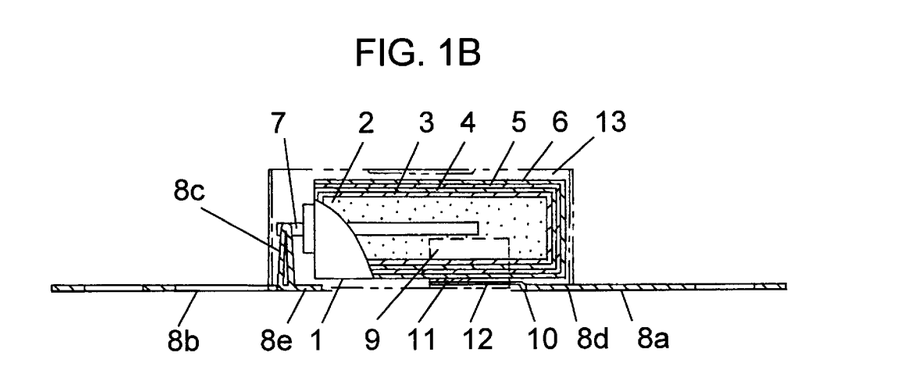
FIG. 1B is a cross-sectional view of FIG. 1A.

FIG. 1A and FIG. 1B show the construction of a chip type solid electrolytic capacitor in a first exemplary embodiment of the present invention. In FIG. 1, a capacitor element 1 is prepared by forming layers, according to the following processes. The layers are formed on the surface of a porous tantalum anode body 2 formed by sintering after powder molding tantalum which is a valve metal. An anode lead wire 7 is buried inside of the anode body 2 with an end of the anode lead wire 7 exposed outside of body 2. An oxide film 3, an electrolyte layer 4 and a carbon layer 5 are formed in succession on the surface of the tantalum anode body 2 according to a known method. Then, a cathode layer 6 composed of a silver paint is formed on the surface of the carbon layer 5.

After having cut the tantalum wire 7 to a predetermined length, the cathode layer 6 of the capacitor element 1 is connected to a cathode lead frame 8a formed on a frame 8 via a conductive adhesive 11. The frame 8 is made of a belt like metal sheet. In this connecting process, the side-to-side positioning of the capacitor element 1 is aligned by a gutter-like guide 9 formed by bending upward both side edges of the cathode lead frame 8a.

Further, the cathode lead frame 8a reaches out while being bent down by one step in a step-wise manner at a shoulder 10 to be kept away from the surface that is connected with the cathode layer 6 of the capacitor element 1. In addition, the cathode lead frame 8a has an opening hole 12 formed thereon at a position corresponding to the center of a section that is parallel with the bottom surface of the capacitor element 1, the shoulder 10 that is formed by bending the lead frame 8a downward by one step in a step-wise manner and a section of the lead frame 8a where it reaches out towards outside. The opening hole 12 is filled with an electrically insulating packaging resin 13 in at a later step of resin packaging.

In the above description, the opening hole 12 was formed in the center of the cathode lead frame 8a. But, the section of the lead frame 8a that was made as the opening hole 12 can be left solid and both ends instead, can be cut out to make openings for resin feeding.

In order to form the guide 9 on the cathode lead frame 8a for aligning the position of the capacitor element 1, both side edges of the cathode lead frame 8a are bent upward. Further, a thermo-setting conductive adhesive 11 is applied to the cathode lead frame 8a where it comes into contact with the edges of both side surfaces and the bottom surface of the capacitor element 1. The thermo-setting conductive adhesive 11 tentatively fixes the capacitor element 1 on the cathode lead frame 8a while connecting the capacitor element 1 with the cathode lead frame 8a.

To form an anode lead frame 8b into a shape that is suitable for connection with the anode lead wire 7, the anode lead frame 8b is partially punched in its center and this punched area is lifted upwards by bending toward the capacitor element 1. Further, the lifted punched area is bent again at its middle position, to form a reversed V-letter shaped structure 8c which is erected on the anode lead frame 8b. the anode lead wire 7 is disposed on the top of the reversed V-letter shaped structure 8c by crossing therewith squarely and joined thereto by resistance welding while a pressing force is applied to the welding point.

Then, the cathode lead frame 8a that has been tentatively fixed to and connected with the cathode layer 6 of the capacitor element 1 by the thermosetting conductive adhesive 11 is placed in an electric oven and the thermosetting conductive adhesive 11 is cured, thereby solidly connecting the cathode layer 6 and the cathode lead frame 8a together.

Figure 2:
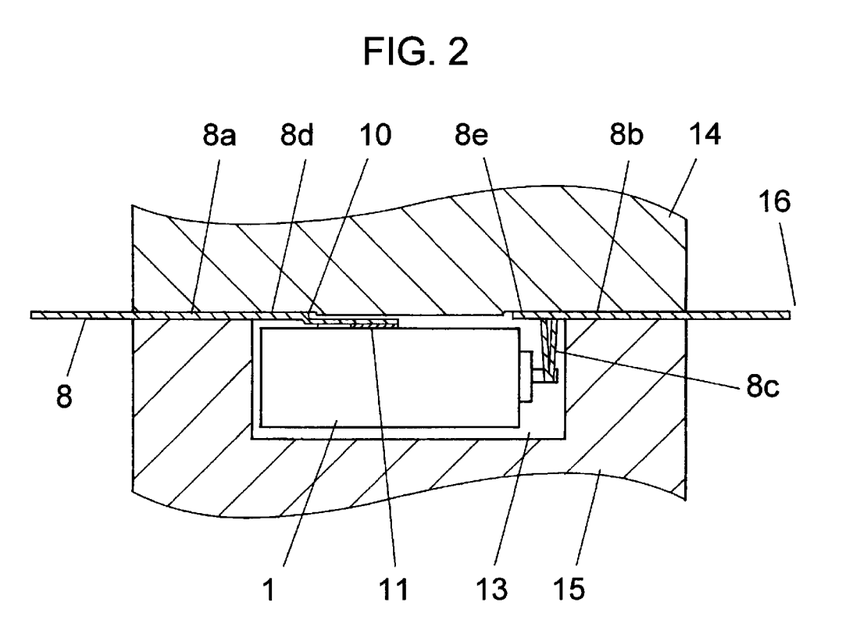
FIG. 2 is a partially cross-sectional view of a resin molding die for use in resin packaging of the chip type solid electrolytic capacitor of FIG. 1.

After the capacitor element 1 has been connected with the belt like frame 8, the capacitor element is resin packaged by the use of an electrically insulating resin according to a transfer molding method. At this time, the resin molding is performed with the partition line 16 designed so as to bring the cathode lead frame 8a and the anode lead frame 8b into direct contact with the upper die 14 as shown in FIG. 2. Each respective surface of the lead frames 8a and 8b is made to be exposed on the outer surface of the resin package by designing the mold having a gap ranging from 0 mm to 0.1 mm between the partition line 16 and the cathode and anode lead frame 8a and 8b.

Next, the resin packaged capacitor element 1 is removed from the mold and cut off from the frame 8. And where the lead frame is exposed above the resin package 13 serves as a cathode terminal 8d or an anode terminal 8e, accordingly. Thus, a chip type tantalum solid electrolytic capacitor of the present invention is completed.

According to the present invention, a chip type solid electrolytic capacitor and its manufacturing method, in which the cathode lead frame 8a is located on the side surfaces of the capacitor element 1 and the cathode lead frame 8a and the cathode layer 6 of the capacitor element 1 are connected with each other, is employed. Therefore, the capacitor element 1 can be made longer without being constrained by the cathode lead frame 8a.

As a result, the volume of the capacitor element 1 can be increased even when the outer dimensions of a chip type solid electrolytic capacitor remain the same.

When the anode lead frame 8b and the anode lead wire 7 are connected with each other, part of the anode lead frame 8b is bent upward and this bent part is bent again at its middle position, thereby forming the reversed V-letter shaped structure 8c standing upright on the anode lead frame 8b, and the anode lead wire 7 is joined to the top of the reversed V-letter shaped structure 8c.

Accordingly, the anode lead wire 7 can be made short and the reversed V-letter shaped structure 8c can withstand the pressing force applied thereto at the time of connection even if the connecting area is small. In addition, when the anode lead wire 7 is joined to the top of the reversed V-letter shaped structure 8c, the anode lead wire 7 is pressed down into the top of the reversed V-letter shaped structure 8c by resistance welding that is accompanied with a pressing force applied to the welding point. Therefore, a sufficiently secure connecting strength is assured, resulting in a high degree of reliability of connection.

Furthermore, since the lead frames 8a and 8b are cut to predetermined dimensions with each respective part exposed on the bottom surface of the resin package 13 left to serve as the terminals 8d and 8e. Accordingly, it is not necessary for both cathode and anode lead frames to be bent along the outer side surface of the resin package in such a way as have been practiced with prior art chip type solid electrolytic capacitors. The length of the resin package 13 can be increased by the amount that would have been needed by the portions of the terminals 8d and 8e formed by being bent along the side surface of the resin package 13.

Therefore, even if the outer dimensions of a chip type solid electrolytic capacitor remain the same as the ones of a prior art chip type solid electrolytic capacitor, the volume of the capacitor element 1 can be increased, thus enabling the realization of a chip type solid electrolytic capacitor that has large capacitance.

Second Exemplary Embodiment

Figure 3A:
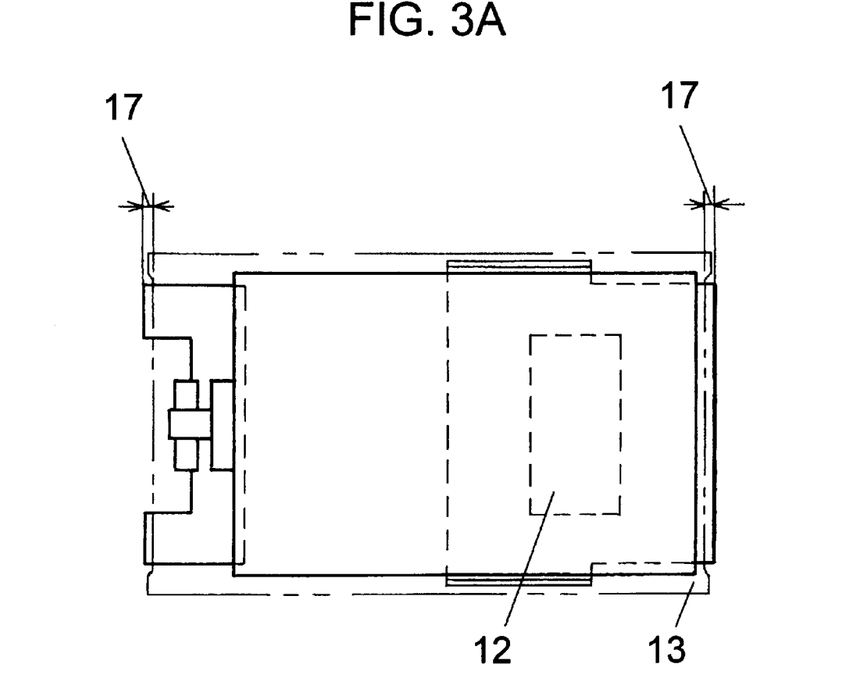
FIG. 3A is a plan view of a chip type solid electrolytic capacitor in a second exemplary embodiment of the present invention.
Figure 3B:
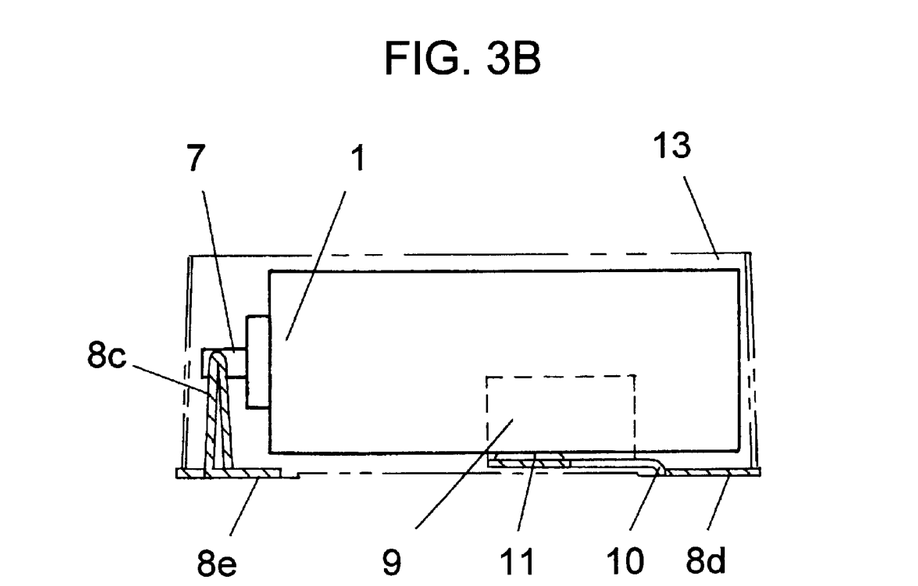
FIG. 3B is a front view of FIG. 3A.

FIG. 3A and FIG. 3B illustrate a plan view and a front view respectively of a chip type solid electrolytic capacitor of a second exemplary embodiment of the present invention. The chip type solid electrolytic capacitor in the present exemplary embodiment is the same as the one in the foregoing first exemplary embodiment except that the tips of the cathode terminal 8d and anode terminal 8e protrude from the resin package by an amount not exceeding 0.5 mm as indicated by the reference numeral 17 in FIG. 3A.

By employing the structure as described above, when the chip type solid electrolytic capacitor in the present exemplary embodiment is mounted on a wiring board by dip soldering, the solder is allowed to ascend upward around the protruding tips of the cathode and anode terminals 8d and 8e, resulting in the realization of an intensified soldering strength.

Third Exemplary Embodiment

Figure 4A:
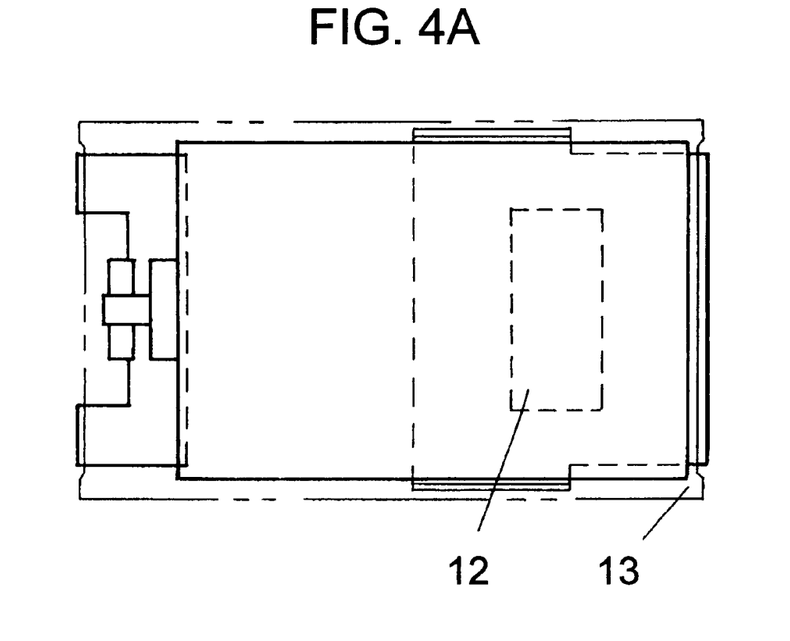
FIG. 4A is a plan view of a chip type solid electrolytic capacitor in a third exemplary embodiment of the present invention.
Figure 4B:
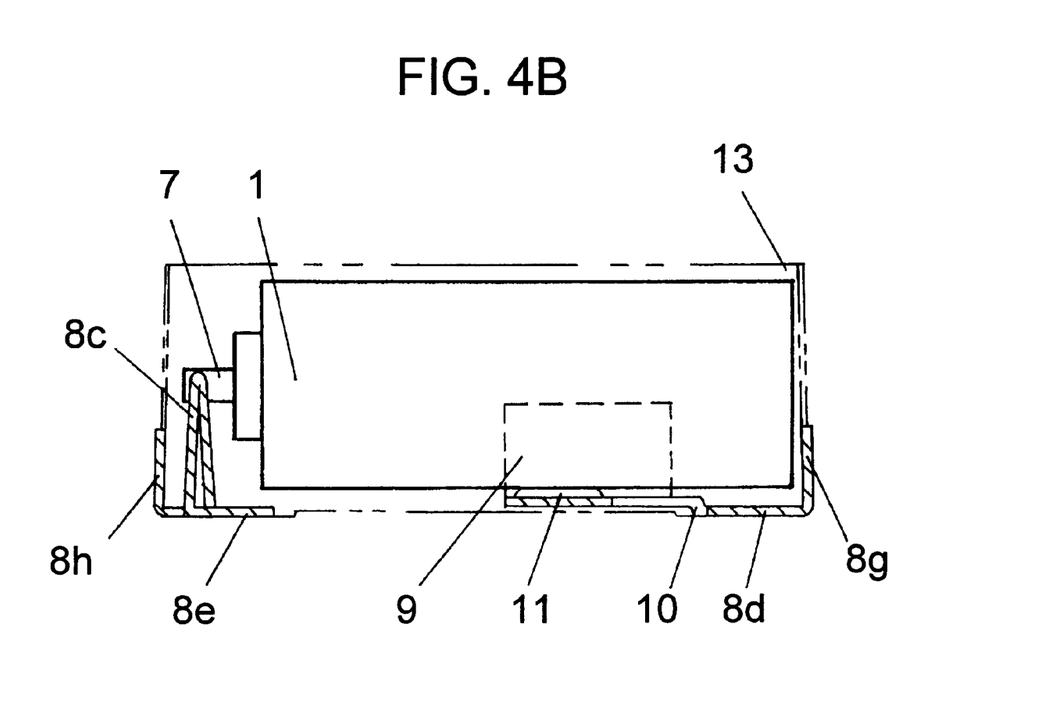
FIG. 4B is a front view of FIG. 4A.

FIG. 4A and FIG. 4B are respectively a plan view and a front view showing the structure of a chip type solid electrolytic capacitor in a third exemplary embodiment of the present invention. The chip type solid electrolytic capacitor in the present exemplary embodiment is the same as the one in the first exemplary embodiment except that the cathode terminal 8d and anode terminal 8e are bent along the outer surfaces of the resin package 13, thereby realizing a structure with bent sections 8g and 8h of the cathode and anode terminals 8d and 8e, on the end surfaces of the resin package 13.

By employing the structure as described above, when the chip type solid electrolytic capacitor in the present exemplary embodiment is mounted on a wiring board by dip soldering, the solder is allowed to ascend upward to the tips of the bent sections 8g and 8h, resulting an intensified soldering strength in the same manner as in the foregoing second exemplary embodiment.

Fourth Exemplary Embodiment

Figure 5A:
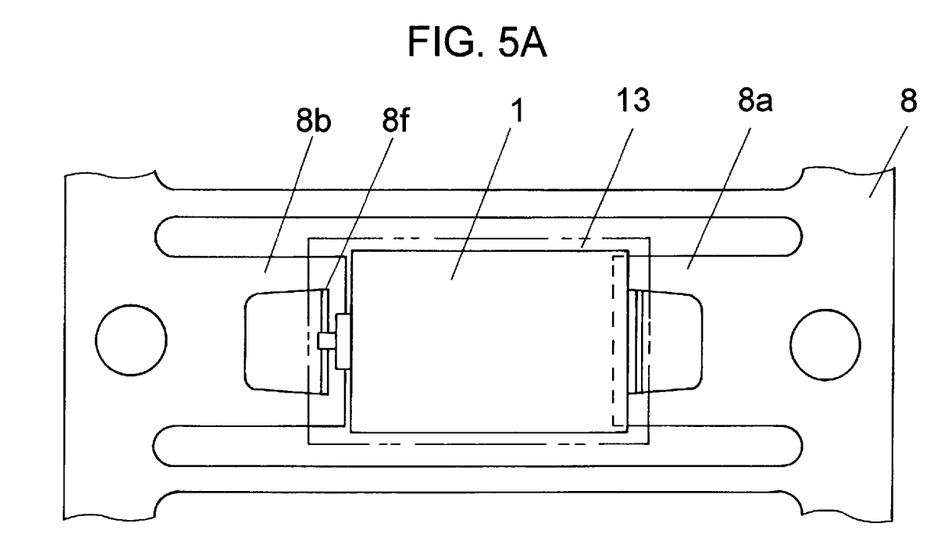
FIG. 5A is a plan view of a chip type solid electrolytic capacitor in a fourth exemplary embodiment of the present invention.
Figure 5B:
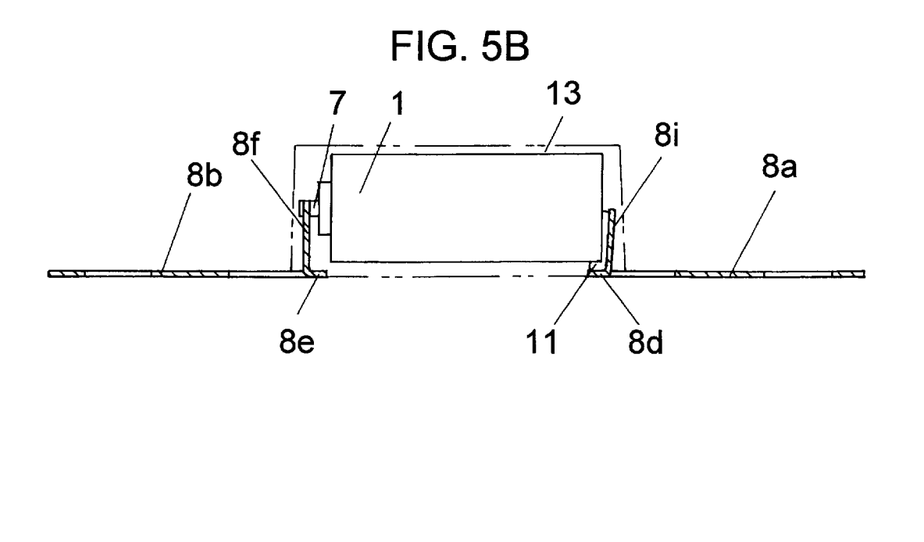
FIG. 5B is a front view of FIG. 5A.

FIG. 5A and FIG. 5B are respectively a plan view and a front view showing the structure of a chip type solid electrolytic capacitor in a fourth exemplary embodiment of the present invention. The chip type solid electrolytic capacitor in the present exemplary embodiment differs from the first exemplary embodiment by the manner in which the capacitor element 1 is connected with the frame 8.

In FIG. 5A and FIG. 5B, a part of the frame 8 is punched in a tongue like shape and lifted by bending toward the cathode lead frame 8a to form a riser 8f. The anode lead wire 7 extending outside of the capacitor element 1 is brought into contact with the tip of the riser 8f, crossing it squarely and connected therewith by welding. In addition, another part of the frame 8 is punched in a tongue like shape and lifted by bending toward the anode lead frame 8b to form a second riser 8i. The cathode layer 6 formed on the capacitor element 1 is connected to this second riser 8i via a conductive adhesive 11.

By employing the structure as described above, the processing steps required to form the risers 8f and 8i can be simplified and alignment of the position of capacitor element 1 can be accurately performed. Additionally, the volume capacity per unit attainable by the capacitor element 1 is further enhanced, thereby enabling the realization of a capacitor with a larger capacitance value. Further, the method of connecting the cathode layer 6 to the cathode lead frame 8a is not limited to one employing the riser 8i. A method of using shoulder 10 accompanied by opening hole 12 as described in the first through third exemplary embodiments can also be employed.

Fifth Exemplary Embodiment

Figure 6A:
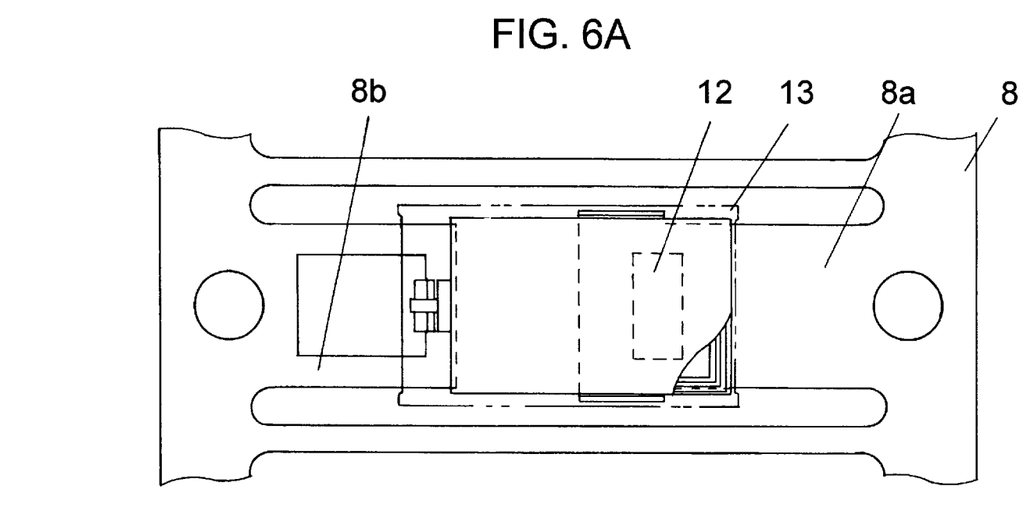
FIG. 6A is a plan view of a chip type solid electrolytic capacitor in a fifth exemplary embodiment of the present invention.
Figure 6B:
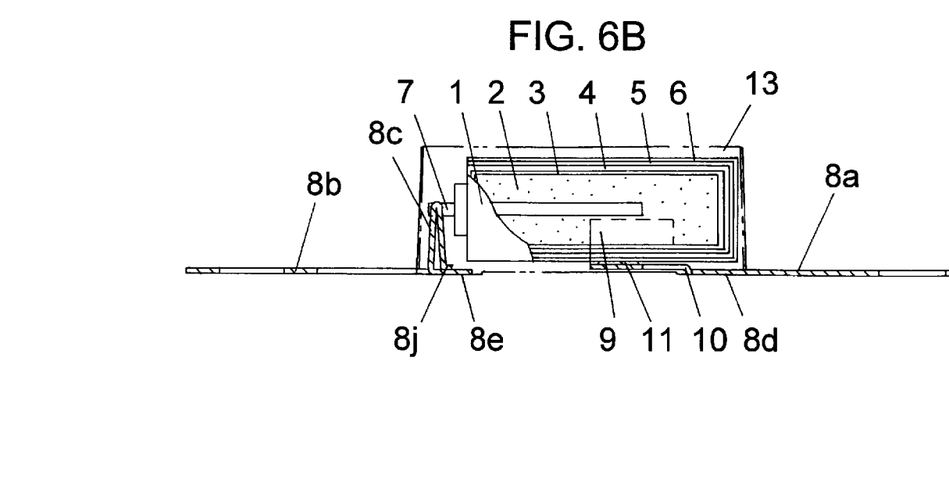
FIG. 6B is a cross-sectional view of FIG. 6A.

FIG. 6A and FIG. 6B are respectively a plan view and a front view showing the structure of a chip type solid electrolytic capacitor of a fifth exemplary embodiment of the present invention. The chip type solid electrolytic capacitor in the present exemplary embodiment is similar to the one in the first exemplary embodiment except that the tip of the extreme end of the reversed V-letter shaped structure is bent to form a crimped part 8j for securely settling on the upper surface of the anode lead frame 8b.

Accordingly, when the tip of the anode lead wire 7 is connected to the reversed V-letter shaped structure 8c by welding, the pressing force applied to the welding point can be intensified, thereby allowing a more reliable welding operation to be carried out.

Sixth Exemplary Embodiment

Figure 7A:
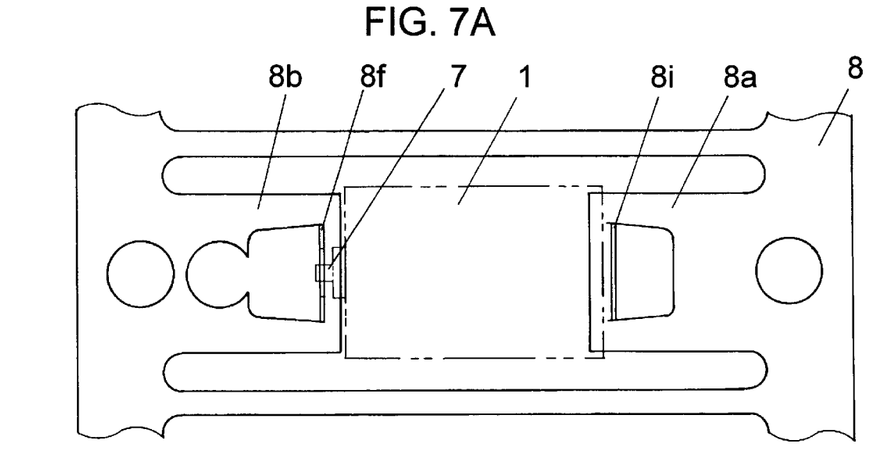
FIG. 7A is a plan view of a chip type solid electrolytic capacitor in a sixth exemplary embodiment of the present invention.
Figure 7B:
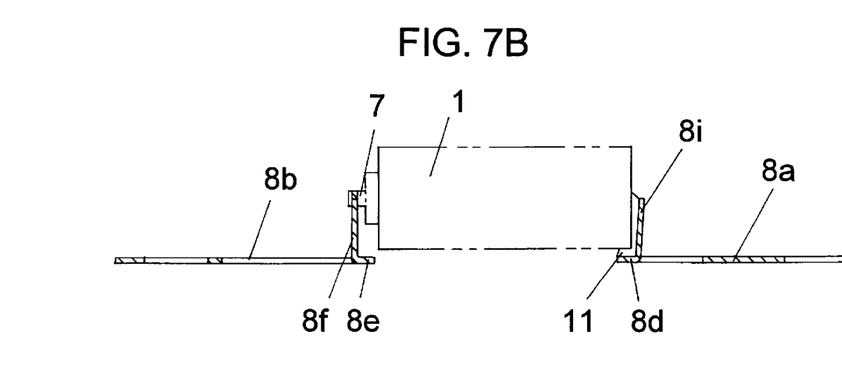
FIG. 7B is a front view of FIG. 7A.
Figure 7C:
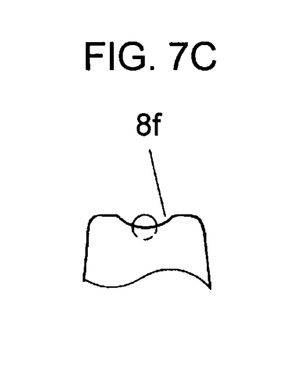
FIG. 7C is a side view of FIG. 7A.

FIG. 7A, FIG. 7B and FIG. 7C are respectively a plan view, a front view and a partial side view showing the structure of a chip type electrolytic capacitor in a sixth exemplary embodiment of the present invention. The chip type solid electrolytic capacitor of the present exemplary embodiment differs from the one in the fourth exemplary embodiment in the configuration of the riser 8f formed on the frame 8 of the chip type solid electrolytic capacitor.

FIG. 7C is a side view showing part of the riser 8f. The top of the riser 8f is removed in a circular arc-like shape, thereby allowing positional alignment of the anode lead wire 7 to be readily made. By performing resistance welding to connect the riser 8f and the tip of the anode lead wire 7 with each other after the foregoing positional alignment has been made, the anode lead wire 7 can be welded to the riser 8f in such a manner as the former is engaged in the latter as shown in FIG. 7C, thus enabling a highly reliable connection.

Seventh Exemplary Embodiment

Figure 8A:
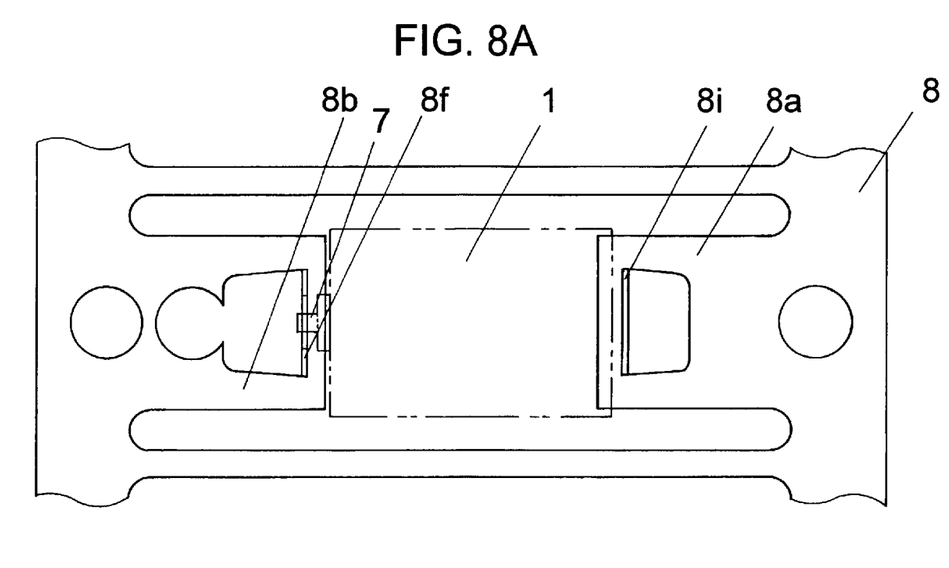
FIG. 8A is a plan view of a chip type solid electrolytic capacitor in a seventh exemplary embodiment of the present invention.
Figure 8B:
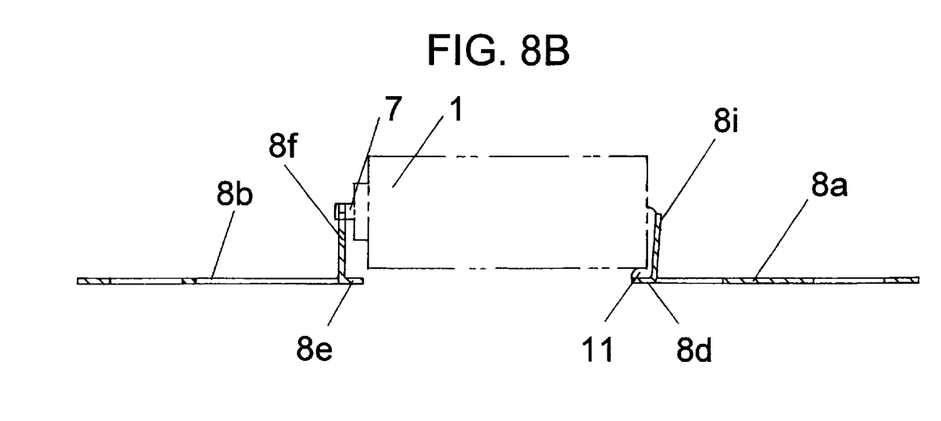
FIG. 8B is a front view of FIG. 8A.
Figure 8C:
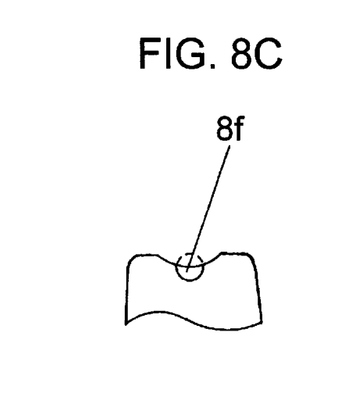
FIG. 8C is a side view of FIG. 8A.

FIG. 8A, FIG. 8B and FIG. 8C are respectively a plan view, a front view and a partial side view showing the structure of a chip type electrolytic capacitor in a seventh exemplary embodiment of the present invention.

The chip type solid electrolytic capacitor of the present exemplary embodiment differs from the one in the sixth exemplary embodiment in the configuration of the riser 8f formed on the frame 8 of the chip type solid electrolytic capacitor.

FIG. 8C is a side view showing part of the riser 8f. The top of the riser 8f, where the anode lead wire 7 is disposed, is provided with a concave area, into which the anode lead wire 7 fits, thereby allowing the positional alignment of the anode lead wire 7 to be readily and accurately made. By performing laser welding, which features distortion free welding, in connecting the riser 8f and the tip of the anode lead wire 7 with each other after the foregoing positional alignment has been made, a highly reliable can be achieved.

The chip type solid electrolytic capacitor and its manufacturing method as disclosed by the present invention are characterized by employing a structure, in which dimensional problems die to forming the terminals formed on both cathode and anode lead frames have been eliminated. As a result, even if the outer dimensions of a chip type solid electrolytic capacitor remain the same, the volume of a capacitor element contained in the chip type solid electrolytic capacitor can be made larger than previous electrolytic capacitors. Further, a chip type solid electrolytic capacitor with a high degree of reliability, and a large capacitance with the smallest possible size can be obtained.

What is claimed is:

1. A chip type solid electrolytic capacitor comprising:
    a capacitor element comprising an oxide layer, an electrolyte layer and a cathode layer in succession on a molded and sintered valve metal anode body having an anode lead wire buried therein wherein said anode lead wire extends outside of the anode body;
    an anode lead frame with one end connected to said anode lead wire extending from said anode body and a second end serving as an anode terminal;
    a cathode lead frame with one end connected to said cathode layer of said capacitor element and a second end serving as a cathode terminal; and
    an electrically insulating resin package encapsulating said capacitor element, wherein part of each respective terminal of said anode and cathode lead frames extends outside resin package in the same plane as an outer surface of said resin package, and the anode and cathode frames remain flush with said outer surface, which serves as a mounting surface of said chip type solid electrolytic capacitor when said chip type solid electrolytic capacitor is mounted on a circuit board.

2. The chip type solid electrolytic capacitor according to claim 1, wherein a gutter-like guide is provided on said cathode lead frame for aligning a position of said capacitor element and a section of said cathode lead frame where said cathode terminal is bent in a step-wise manner to have said section kept away from the surface of the cathode layer of the capacitor element and, hole is provided on said cathode lead frame at a position corresponding to where said cathode lead frame connects with the cathode layer of said capacitor element and, a shoulder formed by bending in a step-wise manner the section of said cathode lead frame wherein said hole is filled with a packaging resin.

3. The chip type solid electrolytic capacitor according to claim 1, wherein a gutter-like guide is provided on said cathode lead frame for aligning the position of said capacitor element and a section of said cathode lead frame where said cathode terminal is bent in a step-wise manner for keeping said section away from the surface of the cathode layer of the capacitor element and, a cut out portion is formed on each respective outer side of said cathode lead frame, through which a packaging resin is filled.

4. The chip type solid electrolytic capacitor according to claim 1 or claim 2, wherein each respective tip of said terminals protrudes outside of the resin package within a limit not exceeding 0.5 mm.

5. The chip type solid electrolytic capacitor according to claim 1 or claim 2, wherein each respective tip of said terminals is bent upward along the outer surface of said resin package.

6. The chip type solid electrolytic capacitor according to any one of claims 1–3, wherein said anode lead wire is connected with a top of a riser formed as part of said anode lead frame.

7. The chip type solid electrolytic capacitor according to claim 4, wherein said anode lead wire is connected with a top of a riser formed as part of said anode lead frame.

8. The chip type solid electrolytic capacitor according to any one of claims 1–3, wherein a reversed V-letter shaped riser is formed as part of said anode lead frame and said anode lead wire is connected with the top of said reversed V-letter shaped riser.

9. The chip type solid electrolytic capacitor according to claim 4, wherein a reversed V-letter shaped riser is formed of part of said anode lead frame and said anode lead wire is connected with the top of said reversed V-letter shaped riser.

10. The chip type solid electrolytic capacitor according to claim 8, wherein a tip end of said reversed V-letter shaped riser is bent to be in contact with the upper surface of the anode lead frame.

11. The chip type solid electrolytic capacitor according to claim 9, wherein a tip end of said reversed V-letter shaped riser is bent to be in contact with the upper surface of the anode lead frame.

12. The chip type solid electrolytic capacitor according to claim 5, wherein the top of said reversed V-letter shaped riser is recessed in a circular arc-like shape.

13. The chip type solid electrolytic capacitor according to claim 6, wherein the top of said reversed V-letter shaped riser is recessed in a circular arc-like shape.

14. The chip type solid electrolytic capacitor according to claim 7, wherein the top of said reversed V-letter shaped riser is recessed in a circular arc-like shape.

15. The chip type solid electrolytic capacitor according to claim 8, wherein the top of said reversed V-letter shaped riser is recessed in a circular arc-like shape.

16. The chip type solid electrolytic capacitor according to claim 9, wherein the top of said reversed V-letter shaped riser is recessed in a circular arc-like shape.

17. The chip type solid electrolytic capacitor according to claim 10, wherein the top of said reversed V-letter shaped riser is recessed in a circular arc-like shape.

18. The chip type solid electrolytic capacitor according to claim 11, herein the top of said reversed V-letter shaped riser is recessed in a circular arc-like shape.

19. The chip type solid electrolytic capacitor according to claim 5, wherein the top of said reversed V-letter shaped riser is provided with a concave area.

20. The chip type solid electrolytic capacitor according to claim 6, wherein the top of said reversed V-letter shaped riser is provided with a concave area.

21. The chip type solid electrolytic capacitor according to claim 7, wherein the top of said reversed V-letter shaped riser is provided with a concave area.

22. The chip type solid electrolytic capacitor according to claim 8, wherein the top of said reversed V-letter shaped riser is provided with a concave area.

23. The chip type solid electrolytic capacitor according to claim 9, wherein the top of said reversed V-letter shaped riser is provided with a concave area.

24. The chip type solid electrolytic capacitor according to claim 10, wherein the top of said reversed V-letter shaped riser is provided with a concave area.

25. The chip type solid electrolytic capacitor according to claim 11, wherein the top of said reversed V-letter shaped riser is provided with a concave area.

* * * * *

UNITED STATES PATENT AND TRADEMARK OFFICE
CERTIFICATE OF CORRECTION

PATENT NO. : 6,236,561 B1
DATED : May 22, 2001
INVENTOR(S) : Masakuni Ogino et al.

It is certified that error appears in the above-identified patent and that said Letters Patent is hereby corrected as shown below:

Title page,
Item [75], correct the spelling of "Kanota" in the 1st inventors city of residence to -- Kanoto --.

Signed and Sealed this

Twenty-seventh Day of November, 2001

Attest:

NICHOLAS P. GODICI
Attesting Officer
Acting Director of the United States Patent and Trademark Office